(12) United States Patent
Nakhjiri et al.

(10) Patent No.: US 9,178,869 B2
(45) Date of Patent: Nov. 3, 2015

(54) LOCATING NETWORK RESOURCES FOR AN ENTITY BASED ON ITS DIGITAL CERTIFICATE

(75) Inventors: Madjid F. Nakhjiri, San Diego, CA (US); Tat Keung Chan, San Diego, CA (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 377 days.

(21) Appl. No.: 13/080,301

(22) Filed: Apr. 5, 2011

(65) Prior Publication Data

US 2011/0246646 A1 Oct. 6, 2011

Related U.S. Application Data

(60) Provisional application No. 61/320,797, filed on Apr. 5, 2010.

(51) Int. Cl.
*G06F 15/173* (2006.01)
*H04L 29/06* (2006.01)
(52) U.S. Cl.
CPC ................................. *H04L 63/0823* (2013.01)
(58) Field of Classification Search
CPC .............. H04L 9/3268; H04L 63/0823; H04L 29/06775; H04L 63/08; H04L 63/10
USPC .................. 707/758, 695; 709/228, 224, 241; 711/165; 380/227, 277; 370/389; 713/158, 175, 193
See application file for complete search history.

(56) References Cited

U.S. PATENT DOCUMENTS

| | | | |
|---|---|---|---|
| 5,699,431 A | 12/1997 | Van Oorschot et al. | |
| 6,055,236 A * | 4/2000 | Nessett et al. | 370/389 |
| 6,128,740 A * | 10/2000 | Curry et al. | 713/158 |
| 6,434,628 B1 * | 8/2002 | Bowman-Amuah | 714/48 |
| 6,519,643 B1 * | 2/2003 | Foulkes et al. | 709/227 |
| 7,653,725 B2 * | 1/2010 | Yahiro et al. | 709/224 |
| 7,860,252 B2 * | 12/2010 | Ryan et al. | 380/277 |
| 7,966,300 B2 * | 6/2011 | Yoshioka | 707/695 |
| 8,078,757 B2 * | 12/2011 | Schwimer | 709/241 |
| 2002/0073310 A1 | 6/2002 | Benantar | |
| 2002/0178361 A1 * | 11/2002 | Genty et al. | 713/175 |
| 2003/0037234 A1 | 2/2003 | Fu et al. | |

(Continued)

FOREIGN PATENT DOCUMENTS

EP 1453241 A1 9/2004

OTHER PUBLICATIONS

Cooper, David, et al., "Internet X.509 Public Key Infrastructure Certificate and Certificate Revocation List (CRL) Profile", The IETF Trust, IETF RFC-5280, May 2008.

(Continued)

*Primary Examiner* — Dustin Nguyen
(74) *Attorney, Agent, or Firm* — Fox Rothschild LLP

(57) ABSTRACT

A method and apparatus are provided for locating network resources over a communication network. The method includes receiving a digital certificate identifying a first entity and extracting information from at least one predetermined field of the digital certificate. The extracted information is used as input to a location generation function to create a resource locator (e.g., a URL). The network resource is contacted over the communication network in accordance with a communication protocol using the resource locator to obtain requested information concerning the first entity.

19 Claims, 5 Drawing Sheets

(56) References Cited

U.S. PATENT DOCUMENTS

| | | |
|---|---|---|
| 2003/0126433 A1 | 7/2003 | Hui |
| 2005/0021969 A1 | 1/2005 | Williams et al. |
| 2005/0193204 A1 | 9/2005 | Engberg et al. |
| 2005/0228998 A1* | 10/2005 | Chan et al. .................... 713/175 |
| 2006/0288224 A1 | 12/2006 | Won et al. |
| 2007/0033420 A1* | 2/2007 | Sherwani et al. ............. 713/193 |
| 2008/0133907 A1* | 6/2008 | Parkinson .................... 713/158 |
| 2008/0172559 A1 | 7/2008 | Yellepeddy |
| 2009/0113156 A1* | 4/2009 | Fujita et al. .................. 711/165 |
| 2009/0164502 A1 | 6/2009 | Dasgupta et al. |
| 2009/0205028 A1 | 8/2009 | Smeets et al. |
| 2010/0095009 A1* | 4/2010 | Matuszewski et al. ....... 709/228 |
| 2010/0106734 A1* | 4/2010 | Calder et al. .................. 707/758 |
| 2010/0138652 A1 | 6/2010 | Sela et al. |
| 2010/0146250 A1 | 6/2010 | Bergerson et al. |

OTHER PUBLICATIONS

PCT Search Report & Written Opinion, Re: Application #PCT/US2011/031250; Jul. 28, 2011.

* cited by examiner (MAIN) CERTIFICATE DATA ATTRIBUTES — *100*

SERIAL NUMBER — *101*
DIGEST ALGORITHM — *102*
SIGNATURE ALGORITHM — *103*
SUBJECT NAME — *104*
ISSUER NAME — *105*
SUBJECT PUBLIC KEY — *106*
VALIDITY — *107*
EXTENSIONS — *108*
DIGITAL SIGNATURE — *109*

*FIG. 2*

LOCATING NETWORK RESOURCES FOR AN ENTITY BASED ON ITS DIGITAL CERTIFICATE

RELATED APPLICATIONS

This application claims priority from U.S. provisional application No. 61/320,797, filed Apr. 5, 2010, which is incorporated by reference herein in its entirety.

BACKGROUND

As network-enabled devices are deployed within a network, there is a need to perform such operations as authentication, configuration, software updates and monitoring in an as automated fashion as possible. As the number of devices within a network grows larger, a general problem for network operators becomes how to locate the various types of information pertaining to the devices which is needed to perform those operations. Specific examples of the information a network operator may need concerning a device deployed in its network may include the device manufacturer, type, capability and operational information based on the device manufacturer and model. Maintaining large device information databases is not desirable because of storage, administration and other availability issues. The problem is exacerbated when the devices are supplied by multiple manufacturers.

Even though device information databases can be maintained by the vendors and accessed by network operators, the network operator still needs to maintain the addresses for these databases, which can itself be a difficult task, particularly if the number of vendors is large. The ability to locate device information databases does not have a scalable and automated solution and thus may be a significant administrative burden, possibly requiring specific signaling protocols to indicate such information.

Another information database a network operator or other devices in the network may need to access is a certificate revocation lists (CRL), which include a list of revoked digital certificates. Digital certificates are widely used over communication networks and in the field of electronic commerce for document and identity authentication purposes. In general, such digital certificates are used to certify the identity of an entity in the digital world, particularly as defined by the public key infrastructure (PKI). In a PKI, a certificate authority (CA) is a trusted entity that issues, renews, and revokes certificates. An end entity is a person, router, server, an end device or other entity that uses a certificate to identify itself.

As digital certificates are issued and used, they may also be revoked for various reasons. Revocation can be defined as the expiry of a certificate's validity prior to its certificate expiration date. A typical example would be when an employee holding a private key on the part of a corporation leaves that corporation. Another example is when the memory holding a device private key is exposed. In those cases it would be necessary for certificates associated with that private key to be revoked. Otherwise any person holding the private key, with the proper access knowledge, could perform unauthorized transactions on the part of the corporation.

Many other situations may require the placement of a certificate on the CRL. For example, each of the following cases illustrate situations involving revoked certificates: when the relationship between an issuing party and an organization is severed or suspended, an issuing authority ceases to operate, there is suspected private key compromise, a certificate is no longer required by the client, etc.

In other situations, digital certificates may be revoked or placed on hold pending some future event. In such a case, a user may have misplaced a private key, associated with a particular certificate, and is currently searching for it. Also, a user may have forgotten the password needed to access the private key. In that case, the associated digital certificate is revoked until the password issue is resolved. Additionally, a user may go on vacation, and request that a digital certificate associated with the user's private key be revoked until the user's return from vacation.

A fundamental requirement of a PKI is to maintain a path or chain of trust. It is therefore essential to have a mechanism by which digital certificates can be verified as to their validity. One solution amongst many standards in use today is the Certificate Revocation List (CRL). The CRL is a published data structure that is periodically updated. The CRL contains a list of revoked certificate serial numbers. The CRL is time-stamped and digitally signed by the CA who issues the certificates, or other third party entities, such as a revocation service. CRLs are currently defined in the X.509 standard and its various versions.

While ideally CRLs are small lists, they may potentially be required to contain as many data items as the number of outstanding certificates in a system. CRLs may grow large under many circumstances, e.g. in environments in which certificates are revoked whenever personnel change jobs or job roles. Large CRLs are a practical concern in systems supporting very large numbers of users. The size of CRLs is a particular concern in systems which require that CRLs be retrieved under the following conditions: from public directories; over low-bandwidth channels; and/or on a frequent basis. The situation is increasingly problematic in systems requiring that several CRLs be checked in order to verify a single public key, such as in the case when chains of certificates must be verified, e.g. as per ITU Recommendation X.509.

SUMMARY

In accordance with one aspect of the invention, a method of locating network resources over a communication network is provided. The method includes receiving a digital certificate identifying a first entity and extracting information from at least one predetermined field of the digital certificate. The extracted information is used as input to a location generation function to create a resource locator. The network resource is contacted over the communication network in accordance with a communication protocol using the resource locator to obtain requested information concerning the first entity.

In accordance with another aspect of the invention, a host device is provided for use in a communication network. The device includes a first component configured to receive a digital certificate from a first entity over the communication system and a second component configured to extract information from at least one predetermined field of the digital certificate. A third component and a processor operatively associated with the third component are also provided. The third component is configured to (i) create a resource locator using the information extracted from the certificate and a location generator function and (ii) cause a network resource to be contacted over the communication network using the resource locator that is created to obtain information concerning an entity identified by the digital certificate.

BRIEF DESCRIPTION OF THE DRAWINGS

FIG. 2 shows one example of a format for a digital certificate.

DETAILED DESCRIPTION

Figure 1:
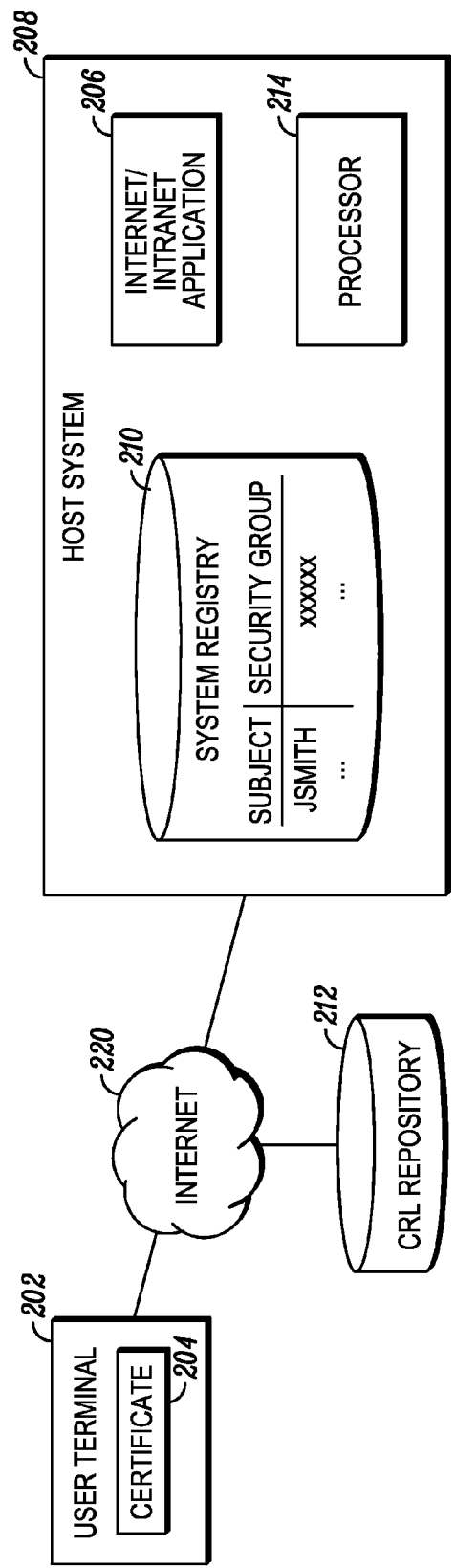
FIG. 1 is a block diagram depicting how an entity may use a digital certificate to be authenticated to a system or application.

With reference now to FIG. 1, a block diagram depicts how an entity may use a digital certificate to be authenticated to a system or application. User terminal 202 possesses a digital certificate 204, which is transmitted over network 220 (e.g., Internet or a private network) to an application 206 that comprises functionality for processing and using digital certificates on a processor 214. Application 206 operates on host system 208. The entity that receives certificate 204 may be an application, a device, a system, a subsystem or the like. Certificate 204 contains a subject name or subject identifier that identifies user terminal 202 to application 206, which may perform some type of service for user terminal 102.

Host system 208 may also contain system registry 210, which is used to authorize user terminal 202 for accessing services and resources within system 208, i.e. to reconcile a user's identity with user privileges. For example, a system administrator may have configured a user's identity to belong to a certain security group, and, if so, the user is restricted to being able to access only those resources that are configured to be available to the security group as a whole. Various well-known methods for imposing an authorization scheme may be employed within the system.

In order to determine whether certificate 204 is still valid, host system 208 accesses a certificate revocation list (CRL) repository 212 over network 202 to ensure that the certificate 204 has not been revoked. Typically, the host system 208 compares the serial number within certificate 204 with a list of serial numbers maintained in the CRL repository 212, and if there are no matching serial numbers, then host system 208 authenticates the user terminal 202. If the CRL has a matching serial number, then certificate 204 should be rejected, and host system 208 can take appropriate measures to reject the user's request for access to any controller resources.

In a conventional system, there are two primary methods by which the host system 208 can locate the CRL repository 212. First, the host system 208 can be preconfigured with the resource locator (e.g., URL) at which the CRL repository 212 is located. However, this approach suffers from scalability issues, particularly when there are different CAs issuing certificates and different CRLs repositories within a single ecosystem (e.g. a consortium such as the WiMAX Forum®). In this case pre-configuration of the host system 208 may be complicated and administratively intensive. In another approach, an extension to the digital certificate is defined. This extension includes the URL at which the CRL repository 212 can be accessed. One example of such an extension is the CRL Distribution Point (CDP) extension defined in IETF RFC 5280. However, not all certificate hierarchies choose to use the CDP extension because of its lack of flexibility, The limited flexibility of the CDP extension arises since the contents of the CDP extension is fixed at the time of certificate issuance, while the resource location of the CRL repository 212, or its position within a trust hierarchy, might change.

As detailed below, the limitations of both of the aforementioned approaches can be overcome by including information in the digital certificate from which the resource locator for the CRL repository can be derived. Even though this certificate information may be fixed, the rules used by the host system 208 to derive the resource locator from the certificate information can be changed and thus the resource locator itself can be changed simply by agreement among the parties, without the need to recall previously deployed devices in order to change their certificates. Not only is this technique more flexible than the use of a CDP extension since the URL can be changed after the certificate is issued, it is also simpler since no additional information needs to be added to the certificate.

While the rules used to derive the resource locator, referred to herein as a Locator Generator Function (LGF), the certificate information that serves as the input data used by the LGF, and the resource locator itself may be selected in virtually an unlimited number of ways, a number of examples will be presented below. In these examples, presented for illustrative purposes only, the resource locator is assumed to be a URL.

In one particular example, the URL may consist of two portions, a static portion and a dynamic portion. The static portion is known to the host system in advance and may be provided to it in a number of different ways. For instance, the host system may be preconfigured with the static portion or the static portion may be provided through software updates or through a device management protocol (e.g. Open Mobile Alliance-Device Management, OMA-DM protocol) which conveys specific configuration parameters. The dynamic portion may be derived by host system in the manner described above. The host system can then form the URL by combining the static and dynamic portions.

For convenience, the static portion may be based on the organization deploying this resource location mechanism and the application that is in need of the resource (e.g., a CRL). For example:

URL_static=http://www.xyz.org/apps/

If the static portion of the URL has this general structure, only the application ("apps") needs to change for a given organization. For instance, if the resource is a CRL, then "apps" could be "crls". Other illustrative resources that may be accessed using this mechanism and the potential character strings that may be used for their corresponding "apps" portion of the URL will be discussed below.

In some cases the organization that employs this resource location technique may be a consortium of organizations or companies. Examples of such consortiums include the WiMAX Consortium, the Long Term Evolution (LTE) Consortium, which is responsible for establishing and managing a mobile communication standard that has been formally submitted as a candidate for 4G wireless systems, and the Alliance for Telecommunications Industry Solutions (ATIS), which is responsible for establishing and managing IPTV standards and services.

The dynamic portion of the URL is a function of information extracted from the digital certificate being authenticated and, potentially other information as well. That is, the dynamic portion of the URL for a resource associated with the certificate for device A is:

URL_dynamic=LGF (A's certificate, other information)

Where LGF is the locator generator function described above. The information from the digital certificate may be extracted from any field of fields of the certificate. The other information, which is optional, can be used along with the information from the digital certificate as the input data to the LGF. An example of such information is a specific type of capability that is related to a service, but which is not included in the device certificate. Other examples of such information include pertinent information that is not known at the time of certificate issuance or which is not intended to be included in a certificate (e.g., to keep production line generic), but which may be dependent on the service for which the device is being used by the operator. Precisely which part(s) of the certificate are used as "Certificate info" and which information is used as "other info" will be included in the definition of the LGF, which must be understood by all the parties (i.e., the entities accessing the HTTP servers and parties setting up the HTTP servers).

The static and dynamic portions together create a complete URL specifying the location of the server or other device hosting the resource that is needed. In one implementation they may be combined as follows:

Server_URL=URL_static/URL_dynamic

Of course, the URL may consist of more than one static portion, more than one dynamic portion, or more than both one static and one dynamic portion. Although there is virtually an unlimited number of functions that may be used as the LGF, particularly desirable functions will often have a number of properties that may be enumerated. For instance, for the URL to be useful along with transport mechanisms such as HTTP, the output from the LGF should be relatively short compared to its input (configuration and certificate). To achieve this, the LGF could either have a compression or truncation function or be a constant-output-length function such as a hash function. Another desirable property is that the LGF should be deterministic so that the same input always results in the same output (i.e., the dynamic portion of the URL).

Aside from the above properties, other practical issues need to be considered when choosing what certificate fields to use as the input data to the LGF. Assume the information for each product category is to be stored at a separate database at a separate URL. While it is desired that the LGF output should be such that all certificates for the same the product category (same database) lead to the same URL, certificates for different product categories should lead to the same URL (one-to-one functionality or many-to-one functionality with low collision probability when different inputs are chosen).

A good example of a function that meets the requirements above is a truncated one-way hash function. The one-way characteristic is not required, but hash functions are readily available and can be truncated to a desired output length of X octets:

LGF=Trunc-X(SHA1 (A's certificate DN||"IPTV PPV"))

The definition of this function requires the distinguished name part of A's certificate to be concatenated with the specific string "IPTV PPV", with the result being passed through a SHA1-hash function and then truncated to X octets. The result becomes part of the URL as described above. Note that in this particular example, the LGF output will be different between subject A and another subject B, whose certificate has a different value for DN.

Many different parts of the digital certificate can be used with the LGF. FIG. 2 shows one example of a format for a digital certificate 100 that complies with the ITU-T Recommendation X.509 (1997 E), as developed by the ISO/IEC/ITU groups. Of course, other certificate formats may be employed as well. The digital certificate 100 includes attributes providing technical information such as a certificate serial number 101. Another attribute, attribute 102 specifies the digest algorithm used in generating the certificate signature. The attribute 103 specifies the signing algorithm (such as RSA or ECC) used in conjunction with the digest algorithm 102 when generating the certificate.

The digital certificate 100 also includes the Subject Name attribute 104, which describes the entity whose public key is being certified, who is sometimes referred to as the Subject. X.509 certificates use distinguished names (DNs) as the standard form of naming. A DN is typically made up of the following components: CN=common name, OU=organizational unit, O=organization, L=locality, ST=state or province, C=country name. The Common Name (CN) of the Subject attribute is normally a required data field. Some possible values for the CN are a hardware-based identifier such as a MAC Address or IMEI, a DNS hostname, or a person's name.

The digital certificate 100 also includes attribute 105, sometimes referred to as the certificate issuer name, which refers to the Certificate Authority (CA) issuing the digital certificate 100 to a Subject. A CA is an entity who issues other digital certificates. The CA has its own digital certificate associated with the key used for signing other entity's certificates. A copy of a CA's digital certificate would be necessary to validate the digital certificate 100 issued by the CA. The digital certificate 100 also includes the entity's Subject Public Key 106 which is a value generated using an asymmetric cryptographic algorithm (such as RSA or ECC). Included as well is the validity period attribute 107 which is the start and end date during which the certificate is considered valid. The start date in the validity period 107 is generally the date and time that the issuing CA signed the certificate.

In the case of an X.509 certificate, the input data to the LGF may be taken from any of attributes described above. For instance, the information that is used may be a hash of the Subject's public key, part or all of the Subject's DN or the Issuer's DN, or a one-way function of the DN, a one-way function of all or part of the Subject's digital certificate, e.g., Hash(Certificate) (sometimes called a thumbprint of the certificate) or all or part of the Subject Alternative Name or a one-way function of it.

It should be noted the URL calculated in the manner described above does not necessarily need to point to the actual resource. Rather, it could point to a symbolic link at which a redirection mechanism is located. The redirection mechanism directs the request to the actual resource. The symbolic link may be pre-established as part of a standards specification or agreement. In this way the burden of re-configuring the actual link is reduced to the burden of re-configuring only the re-direction entity that redirects the requestor to the physical location of the actual resource such as a CRL or other database. A symbolic URL is useful in cases where a URL is to be standardized but the actual link is not yet established (because, for instance, either the server location is unknown or the type of server is unknown since the actual CA has not been established or the product has not yet been planned).

Figure 3:
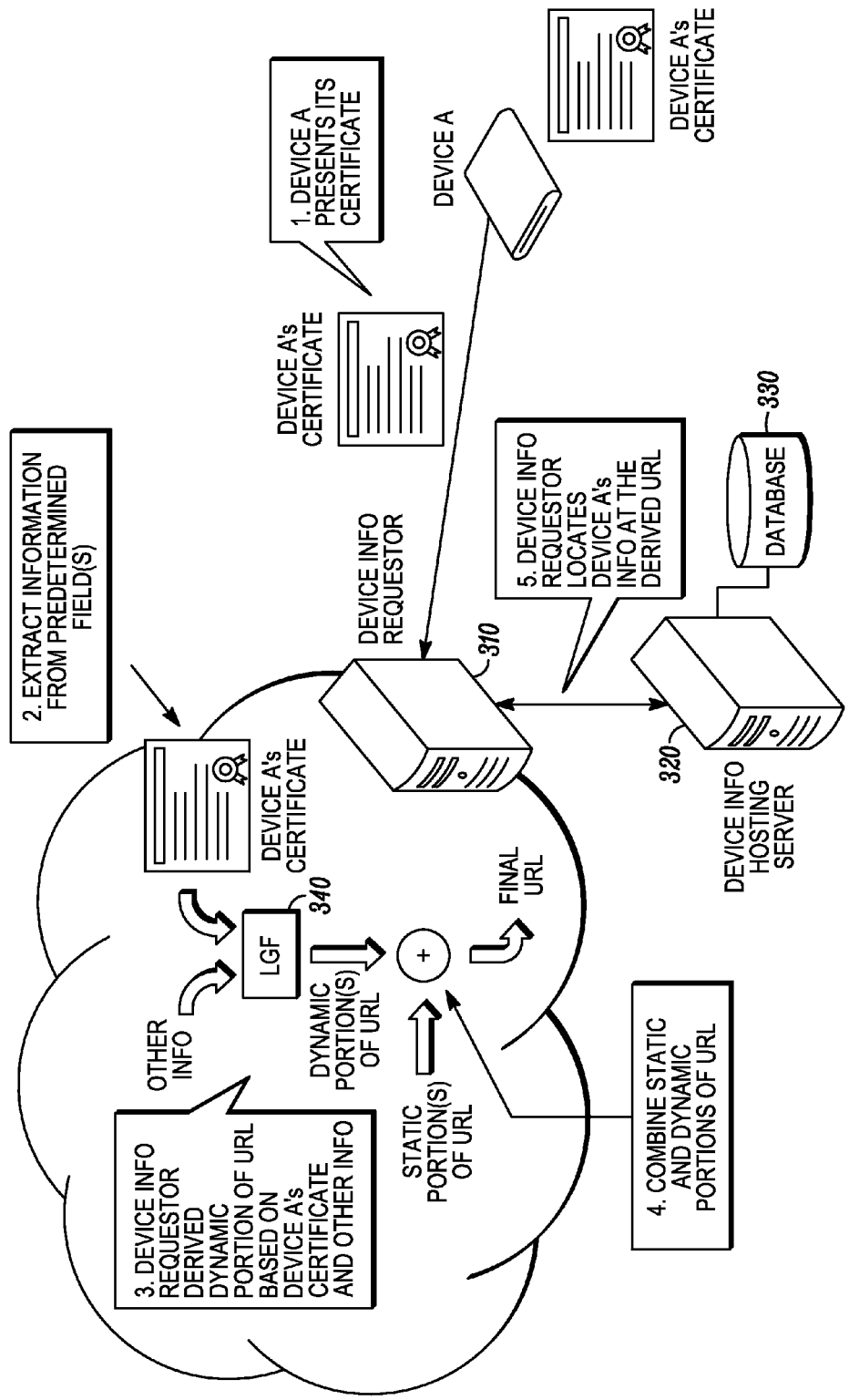
FIG. 3 shows an example of a method for locating a network resource.
Figure 5:
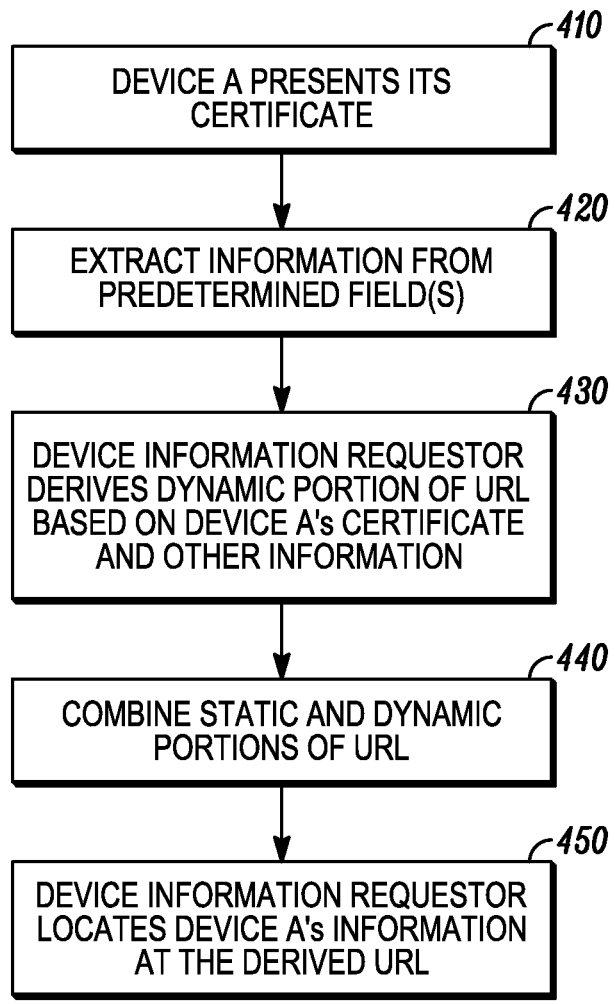
FIG. 5 is flowchart of one example of a method for locating a network resource corresponding to the example of FIG. 3.

An example of a method for locating a network resource will be illustrated in connection with FIG. 3 and the flowchart of FIG. 5. In this example a device information requestor 310 needs to locate a network resource which maintains information concerning a device A. The network resource in this example is a hosting server 320 that has access to a device information database 330. As indicated at 1 (step 410 in FIG. 5), device A presents its certificate to the device information requestor 310. At 2 (step 420 in FIG. 5), the requestor 310 extracts information from one or more predetermined fields of the certificate. The requestor 310 uses this information, and possibly additional information, as input to an LGF 340 to derive at 3 (step 430 in FIG. 5) the dynamic portion of the URL for the hosting server 320. At 4 (step 440 in FIG. 5), the device information requestor combines the dynamic portion of the URL with the static portion, with which the requestor has been pre-provisioned, to obtain the URL for hosting server 320. Finally, at 5 (step 450 in FIG. 5), the requestor 310 contacts the hosting server 320 at the URL that has been determined.

In general it is assumed that the device information requestor 310 itself will extract and process the information from the digital certificate to create the dynamic portion of the resource locator. However, this need not be the case. For example, the requestor 310 may forward the certificate to another server which performs the necessary processing and simply returns the dynamic portion of the resource locator to the device information requestor 310.

The following additional examples are presented to facilitate a further understanding of various aspects of the invention as applied to different use cases.

Example 1

This first use case pertains to the example discussed above in which the resource being accessed by a requester is a CRL repository. In this example, party B (e.g. a client device) needs to authenticate itself to party A (e.g. a network server) by presenting its (i.e., party B) digital certificate to party A, using a predefined authentication protocol, which typically involves party B digitally signing a message using the private key associated with the certificate. Before using B's certificate, A needs to verify the validity of B's certificate. One of the certificate verification steps is to verify that B's digital certificate is not revoked. Typically this is done by checking the certificate against a certificate revocation list (CRL) pertaining to that certificate: if the certificate information is on the CRL, the certificate has been revoked. To perform this check, party A needs to obtain the latest copy of the relevant CRL, which presents the practical issue of first locating the CRL, which can be a challenge since the CRL may be issued by the CA that issued B's digital certificate, or it could be issued by another entity (e.g. the Root CA in the chain). The former case is referred to herein as "Direct CRL", while the latter referred to as "Indirect CRL".

Figure 4A:
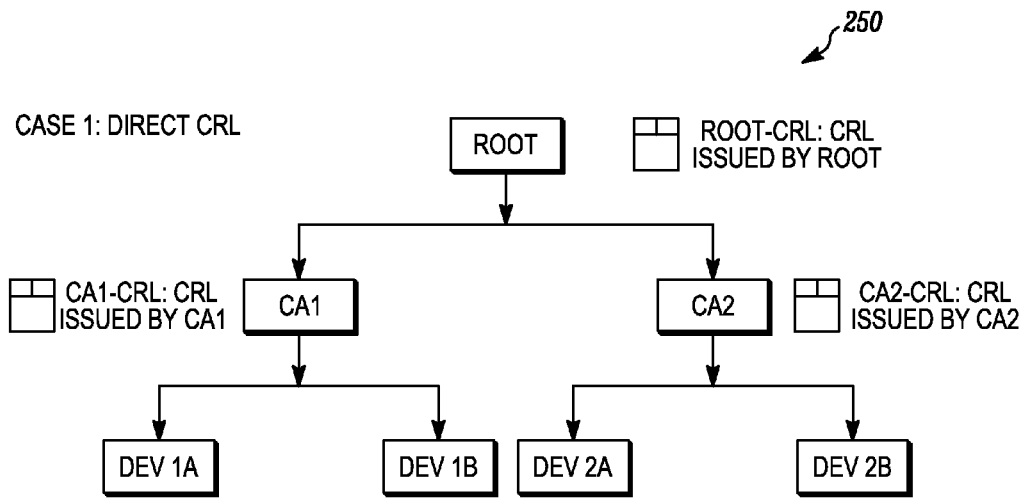
FIGS. 4a and 4b illustrate a three-level certificate hierarchy with a direct certificate revocation list (CRL) and an indirect CRL, respectively.
Figure 4B:
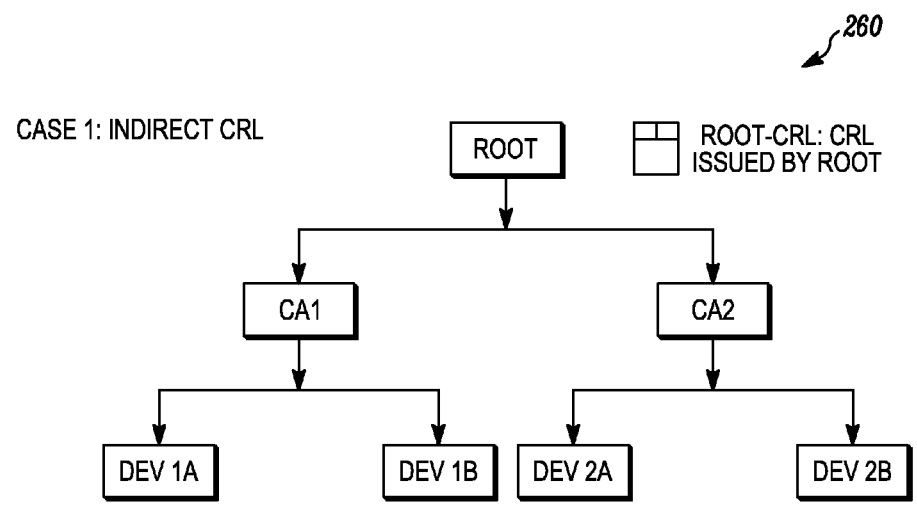

FIGS. 4*a* and 4*b* illustrate a three-level certificate hierarchy consisting of a Root CA, two Sub-CAs (CA1 and CA2), and device certificates. FIG. 4*a* represents a certificate hierarchy 250 with a direct CRL and FIG. 4*b* represents a certificate hierarchy 260 with an indirect CRL. As the figures indicate, in the direct CRL case, a Sub-CA is responsible for issuing CRLs that include revoked certificates issued by itself. In the indirect CRL, the Root CA is responsible for issuing a CRL that includes all revoked certificates issued by the Su-CAs underneath it.

The resource locator in this example is a URL having the following form:
URL=http://URL_static/<URL_dynamic>
The URL_static portion is:
http://www.xyz.org/crls/
The URL_dynamic portion is:
URL_dynamic=LGF (B's certificate, other info)
Where examples of the LGF are:
1. SHA1 (Issuer's public key).crl
2. Trunc_10 (SHA1 (Issuer's public key)).crl,
3. Trunc_10 (SHA1 (Issuer's Distinguished Name)).crl These examples of the LGF use only the SHA1 hash of the issuer's public key (often found in the Authority Key Identifier (AKI) extension of the certificate) or the issuer's Distinguished Name. In example 1 the SHA1 hash of the public key is used as is, while in examples 2 and 3 a truncated hash function of the specified attributes of the certificate are used. The ".crl" portion of the URL is simply used to refer to a CRL file. Thus the URL at which the CRL is located can be any of the following:
1. http://www.xyz.org/crls/<SHA1 (Issuer's public key)>.crl
2. http://www.xyz.org/crls/<Trunc_10 (SHA1(Issuer's public key))>.crl
3. http://www.xyz.org/crls/<Trunc_10 (SHA1 (Issuer's Distinguished Name))>.crl Example 2

In this second example, a service operator wants to obtain information concerning the a client device. Such information may include device capabilities (for a specific model), information on how to configure or manage a specific device model, a list of devices that should not be let onto the network (i.e., a blacklist), a device security robustness profile, and so on. It is undesirable for the operator to maintain its own database due to complexity and scalability issues. The operator would rather rely on databases provided by the device vendors (i.e., manufacturers). However, in cases where the number of devices and vendors is large, maintaining pointers to the location (e.g. URL) of these databases may not be desirable either. Thus, instead of storing or signaling these location pointers (e.g. URLs), they can be calculated using the information readily available within the device's digital certificate, along with some configuration information that is pre-specified and agreed upon. For instance, a URL for a vendor's device information could be of the following form:
http://www.<manu>.com/devicecap/<devinfo>
where <manu> is the first dynamic portion of the URL and /devicecap/ is one of the static portions. The value of <manu> can be determined based on the Manufacturer Name, Manufacturer ID, or the Vendor ID that is embedded in the device certificate. The portion of the URL denoted <devinfo> is a second dynamic portion of the URL. This second dynamic portion is derived using an LGF as described above using as input data information regarding the applicable service as well as information extracted from the device certificate, including but not limited to any combination of the examples given above, and/or the following:
1. Part or all of the "Product Type" field that identifies the type of device, or a one-way function thereof
2. Part or all of the "Model Name" or "Model ID" field that identifies the particular model, or a one-way function of those fields.
3. The type of service for which the device is being configured. Such information may not be available within the device certificate, but it may be important in order to find the proper information database for this type of service.

In this example, "Product Type", "Model Name", and "Model ID" may be specified in any pre-agreed and pre-specified fields of the certificate. For instance, they may be embedded in the Subject's DN, such as in the OU (Organization Unit) fields or the CN (Common Name) field.

In some cases protocols have been established by which device information can be obtained from remote databases. Many networks such as DSL, WiMAX and IPTV networks are now using remote management and configuration of devices as part of device attachment to the network. In these networks remote configuration and management servers need device information in order to know how to perform their function. For instance, in the ATIS IPTV architecture, the RCMS (Remote Configuration and Management System)

protocol is defined for sending configuration information to an RCMS server that requests the device information.

The techniques described herein may be used by the RCMS server to locate the appropriate database. That is, the information in the device certificate can be used directly to reach databases maintaining device information.

The following example illustrates how an RCMS server can locate a network resource that stores configuration information for various devices. A device first sends a request to attach to a network and as part of the process (typically using DHCP), it receives the address for the RCMS server. The RCMS server receives a certificate from the device as part of an authentication or security exchange (e.g. for setting a TLS session between the RCMS and device for protecting the configuration signaling). If the RCMS server has seen this type of device before, it already has done what it needs to, and knows how to configure the device, typically via TR069 signaling or other standards for configuration and management. But if this is the first time the RCMS server has configured a device of this type, it proceeds as follows to obtain the information from a device profile information database.

The RCMS server extracts information from one or more pre-specified fields in the device certificate (e.g., O=<county>, OU=manufacturer, OU=model name) and constructs a URL as described above. In the simplest case a very simple convention such as www.<manufacturer_name is extracted for OU>.com/<model_name extracted from another OU>. A more complicated function could use a hash function, which may result in a URL that is not particularly human-reader friendly. It is also possible to have the RCMS server and other entities use a symbolic URL and deploy a redirect server that receives the requests with the symbolic URL. The redirect server then calculates the dynamic URL and performs a re-route to reach the device profile information database at the manufacturer.

The RCMS may use dynamic mapping to convert a complex URL to a simpler, more human-reader friendly URL. In the event a simple instruction is used, such a conversion is not needed. Either way, the result is a URL specifying the location of a device profile information database at the manufacturer, from which the RCMS server can obtain the device robustness profile (to determine, for instance, if the device is fit for receiving valuable content or privileged software upgrades). Once the URL has been determined, the RCMS server contacts the database at that URL, possibly using HTTP exchange, and obtains the desired data for the device and then proceeds with device configuration and management.

Example 3

In lieu of or in addition to checking for a CRL, a standard for the Online Certificate Status Protocol (OCSP) has been promulgated. The use of OCSP requires each certificate-using application to contact a server to get the status of a certificate, e.g., current, expired, or unknown. An OCSP client issues a status request to an OCSP responder and suspends acceptance of a certificate until the responder returns a response. In some circumstances, the availability of an OCSP responder may suffer from the overwhelming burden of numerous OCSP status requests.

Similar to the use of a CRL, the first issue for an OCSP client (entity B) in need of verifying the validity of a certificate (for entity A) is how to locate the OCSP responder. CRL and OCSP may be used in connection with a wide variety of devices and organizations, including, for instance, the aforementioned WiMAX Forum®, LTE, and ATIS (e.g. IPTV forum).

As used in this application, the terms "component," "module," "system," "apparatus," "interface," or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications may be made to this configuration without departing from the scope or spirit of the claimed subject matter.

The invention claimed is:

1. A method of locating network resources over a communication network, comprising:
    receiving a digital certificate identifying a first entity;
    extracting information from at least one predetermined field of the digital certificate;
    using the extracted information as input to a location generation function to create a resource locator comprising at least one static portion and at least one dynamic portion, for a certificate revocation list repository, wherein the location generation function comprises rules used to derive the resource locator, and wherein said at least one dynamic portion is derived by the location generation function from the information extracted from the digital certificate; and
    contacting the network resource over the communication network in accordance with a communication protocol using the resource locator to obtain requested information concerning the first entity.

2. The method of claim 1, further comprising forwarding the digital certificate to a second entity over the communication network to perform the extracting and creating steps and further comprising receiving at least a portion of the resource locator from the second entity over the communication network.

3. The method of claim 1, wherein the resource locator is a uniform resource locator to be used with Hypertext Transfer Protocol (HTTP) to contact an HTTP server.

4. The method of claim 1, further comprising obtaining the static portion of the resource locator from a source other than the digital certificate.

5. The method of claim 1, wherein the resource locator specifies a network location of the certificate revocation list repository associated with a certificate authority issuing the digital certificate.

6. The method of claim 1, wherein the resource locator specifies a network location of an OCSP responder with which the digital certificate is associated.

7. The method of claim 1, wherein the first entity is a device and the resource locator is used to locate a database maintaining information pertaining to the device.

8. The method of claim 7, further comprising obtaining information from the database regarding at least one characteristic of the device selected from the group consisting of device capability, device configuration information and device blacklist information.

9. The method of claim 1, wherein the location generator function includes a truncated hash function.

10. The method of claim 1, wherein the location generator function uses the extracted information as input data without alteration.

11. A host device for use in a communication network, comprising:
- a first component configured to receive a digital certificate from a first entity over the communication system;
- a second component configured to extract information from at least one predetermined field of the digital certificate; and
- a third component and a processor operatively associated with the third component, said third component comprising a non-transitory computer readable medium storing computer readable instructions that when executed cause the processor to (i) create a resource locator for a certificate revocation list repository using the information extracted from the certificate and a location generator function, wherein the location generation function comprises rules used to derive the resource locator, and wherein the resource locator includes a dynamic portion that is determined by the third component via the location generation function using the extracted information as input data, said resource locator also including a static portion that is combined with the dynamic portion to form the resource locator, and (ii) cause a network resource to be contacted over the communication network using the resource locator that is created to obtain information concerning an entity identified by the digital certificate.

12. The host device of claim 11, wherein the third component is at least in part configured to create the resource locator using remote management signaling or a software update.

13. The host device of claim 11, wherein the third component is reconfigurable to alter how the information is extracted from the digital certificate or how the resource locator is created.

14. The host device of claim 11, wherein the third component is preconfigured with the static portion of the resource locator.

15. The host device of claim 11, wherein the first entity is a device and the resource locator is used to locate a database maintaining information pertaining to the device.

16. The host device of claim 11, wherein the resource locator specifies a network location of the certificate revocation list repository associated with a certificate authority issuing the digital certificate.

17. At least one non-transitory computer-readable medium encoded with instructions which, when executed by a processor, performs a method including:
- causing information to be extracted from at least one predetermined field of one or more digital certificates each identifying a respective entity;
- for each of the one or more digital certificates, causing a location generation function to create a resource locator, comprising at least one static portion and at least one dynamic portion, for a certificate revocation list repository using the extracted information as input, wherein the location generation function comprises rules used to derive the resource locator, and wherein said at least one dynamic portion is derived by the location generation function from the information extracted from the digital certificate; and
- for each of the one or more digital certificates, causing a network resource located using the resource locator to be contacted over a communication network to obtain requested information concerning the respective entity identified by each of the one or more digital certificates.

18. The computer-readable medium of claim 17, wherein the resource locator specifies a network location of the certificate revocation list repository associated with a certificate authority issuing the digital certificate.

19. The computer-readable medium of claim 17, wherein the location generator function includes a truncated hash function.

* * * * *